(12) United States Patent
Berthon et al.

(10) Patent No.: US 12,188,503 B2
(45) Date of Patent: Jan. 7, 2025

(54) PIN FOR REDIRECTING SHEAR LOADS ON PLATES TO A DIRECTION PERPENDICULAR TO THE PLATES

(71) Applicant: VOLVO TRUCK CORPORATION, Gothenburg (SE)

(72) Inventors: Patrick Berthon, Tramoyes (FR); Corentin Bourdon, Miribel (FR); Gilles Gaffarelli, Mions (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 300 days.

(21) Appl. No.: 17/775,141

(22) PCT Filed: Nov. 4, 2020

(86) PCT No.: PCT/EP2020/080871
§ 371 (c)(1),
(2) Date: May 6, 2022

(87) PCT Pub. No.: WO2021/089578
PCT Pub. Date: May 14, 2021

(65) Prior Publication Data
US 2022/0389949 A1 Dec. 8, 2022

(30) Foreign Application Priority Data
Nov. 8, 2019 (WO) .................. PCT/EP2019/080741

(51) Int. Cl.
*F16B 19/02* (2006.01)
*B60R 19/56* (2006.01)
(Continued)

(52) U.S. Cl.
CPC .............. *F16B 19/02* (2013.01); *B60R 19/56* (2013.01); *F16B 5/02* (2013.01); *F16B 17/008* (2013.01)

(58) Field of Classification Search
CPC ...... F16B 5/0621; F16B 17/008; F16B 19/02; F16B 21/00; F16B 5/02; F16B 5/025; F16B 5/0642; B60R 19/56
See application file for complete search history.

(56) References Cited

U.S. PATENT DOCUMENTS 3,604,298 A * 9/1971 Dekiel .................... F16B 19/02
83/699.31
4,106,877 A 8/1978 Ferguson
(Continued)

FOREIGN PATENT DOCUMENTS

FR 3077346 A3 8/2019
JP 53-40168 U * 4/1970
(Continued)

OTHER PUBLICATIONS

International Search Report and Written Opinion of the International Searching Authority, PCT/EP2020/080871, mailed Feb. 5, 2021, 13 pages.
(Continued)

*Primary Examiner* — Daniel J Colilla
(74) *Attorney, Agent, or Firm* — Sage Patent Group (57) ABSTRACT

A system, including a pin having a first cylindrical portion defining a first central axis and a second cylindrical portion defining a second central axis that is parallel to and offset from the first central axis, a first plate with a first aperture matching with the cross section of the first cylindrical portion; a second plate with a second aperture matching with the cross section of the second cylindrical portion, the second plate lying against the first plate where the first cylindrical portion of the pin is inserted in the first aperture and includes a first surface that axially abuts against the second plate and wherein the second cylindrical portion of
(Continued)

the pin is inserted in the second aperture and includes a second surface that axially abuts against the first plate.

7 Claims, 3 Drawing Sheets

(51) Int. Cl.
  *F16B 5/02* (2006.01)
  *F16B 5/06* (2006.01)
  *F16B 17/00* (2006.01)

(56) References Cited

U.S. PATENT DOCUMENTS

| | | | | |
|---|---|---|---|---|
| 4,918,826 | A | * | 4/1990 | Moore ................ G01B 11/26 33/645 |
| 6,855,167 | B2 | * | 2/2005 | Shimp ................ A61F 2/28 623/17.11 |

FOREIGN PATENT DOCUMENTS

| | | |
|---|---|---|
| JP | S53-40168 U | 4/1978 |
| JP | 2006-177454 A | 7/2006 |
| SE | 8700991 L | 9/1988 |

OTHER PUBLICATIONS

International Search Report and Written Opinion of the International Searching Authority, PCT/EP2019/080741, mailed Jul. 28, 2020, 11 pages.

* cited by examiner

PIN FOR REDIRECTING SHEAR LOADS ON PLATES TO A DIRECTION PERPENDICULAR TO THE PLATES

CROSS REFERENCE TO RELATED APPLICATIONS

This application is a 35 U.S.C. § 371 national stage application of PCT International Application No. PCT/EP2020/080871 filed on Nov. 4, 2020, which in turns claims foreign priority to International Patent Application No. PCT/EP2019/080741, filed on Nov. 8, 2019, the disclosures and content of which are incorporated by reference herein in their entirety.

BACKGROUND

Pins are used in mechanical assemblies for a number of purposes. Pins may for example be used to position different pieces with precision. Pin may also be used to transfer a force from one piece to another piece, whereby the pin is housed within such both pieces.

While pins may participate in the junction of different pieces, pins tend to be loose, tight fitted or soldered in place, differently from other mechanical elements such as screws or bolts.

For example in patent FR3077346 related to a cleat for shelf, there is disclosed a pin that has first and second cylinders whose axes are parallel and eccentrically formed together, with the diameter of first cylinder being larger than diameter of second cylinder. The use of such pin is however only to avoiding mounting the latch in wrong direction.

Same applies to the pins described in JPS5340168U which also have first and second cylinders whose axes are parallel and eccentrically formed together. Their aim is to strongly fit with the receiving part and ensure that the receiving parts are well placed one with regard to the other.

Although the shapes of the pins in the cited above prior art are similar to the pins that are part of the system according to the present invention, this disclosure describes pins that will allow transmitting their receiving plates a shear force originating from a shock. The pins in the present system have no centering role nor mounting function. Indeed, there is a need for the system to be effective that, without load applied on the device, there is no contact between the pin and the frames receiving the pin (there is a little gap).

SUMMARY

This disclosure proposes a pin comprising:
a first cylindrical portion along a pin axis; and
a second cylindrical portion along the pin axis;
whereby the first and the second cylindrical portions share
   a common end plane perpendicular to the pin axis, the common end plane defining both a first end cross section at which the first cylindrical portion terminates and a second end cross section at which the second cylindrical portion terminates;
whereby:
the first and second end cross sections partially coincide along a common end cross section area;
the first end cross section further comprises a first offset area extending away from the second end cross section; and
the second end cross section further comprises a second offset area extending away from the first end cross section.

The pin may be such that the first cylindrical portion comprises a flat area, the first end cross section comprising a segment corresponding to the flat area, the flat area being comprised in a plane parallel to the pin axis.

The pin may be such that the common end cross section area is of more than 200 mm$^2$ and of less than 1500 mm$^2$.

The pin may be such that each one of the first and the second offset areas cover a surface of less than 30% of the surface of the common end cross section area.

The pin may be such that the first cylindrical portion comprises three flat areas, the first end cross section comprising three segments corresponding to the three flat areas, the three flat areas being comprised in planes parallel to the pin axis, each one of the three segments being comprised in a respective edge of an equilateral triangle.

This disclosure also proposes a system comprising:
a pin according to this disclosure,
a first plate parallel to the common end plane and comprising a first aperture matching the first end cross section, whereby the first cylindrical portion of the pin is inserted in the first aperture, and whereby the second offset area lies against the first plate;
a second plate parallel to the common end plane and comprising a second aperture matching the second end cross section, whereby the second cylindrical portion of the pin is inserted in the second aperture, and whereby the first offset area lies against the second plate, the second plate lying against the first plate The system according to the present invention comprises
   at least one pin having a first cylindrical portion defining a first central axis and a second cylindrical portion defining a second central axis that is parallel to and offset from the first central axis
   a first plate comprising a first aperture matching with the cross section of the first cylindrical portion;
   a second plate comprising a second aperture matching with the cross section of the second cylindrical portion, the second plate lying against the first plate;
wherein the first cylindrical portion of the pin is inserted in the first aperture and comprises a first surface that axially abuts against the second plate and wherein the second cylindrical portion of the pin is inserted in the second aperture and comprises a second surface that axially abuts against the first plate.

The system may also further comprise bolts joining the first and the second plates together, whereby the first and second plate comprise matching through apertures, the bolts passing through the matching apertures.

The system may also further comprise:
an additional pin according to this disclosure,
the first plate comprising an additional first aperture matching the first end cross section of the additional pin, whereby the first cylindrical portion of the additional pin is inserted in the additional first aperture and comprises a first surface that axially abuts against the second plate;
the second plate comprising an additional second aperture matching the second end cross section of the additional pin, whereby the second cylindrical portion of the additional pin is inserted in the additional second aperture and comprises a second surface that axially abuts against the first plate.

This disclosure also proposes a rear underrun protection for a truck, the rear underrun protection comprising two or more systems as per this disclosure, the rear underrun protection further comprising a bar and a frame, the bar being attached to two or more brackets, each bracket comprising a first plate, the frame comprising the second plates.

The rear underrun protection may be such that a pin comprises a flat area according to this disclosure, whereby the pin is inserted so that the flat area is comprised in a plane perpendicular to a longitudinal axis of the truck.

The rear underrun protection may be such that the offset areas lie against the plates so as to transmit to the plates a shear force originating from a rear underrun shock.

This disclosure also proposes an assembly method of a system according to the present invention into a underrun protection for a truck, comprising the steps of:
 i. Attaching two or more brackets to the bar, each bracket comprising at least a first plate
 ii. Attaching at least one frame to the underrun protection, the frame comprising at least a second plate
 iii. Inserting the first cylindrical portion of the at least one pin in the first matching aperture of the first plate and inserting the second cylindrical portion of the at least one pin in the second matching aperture of the second plate such that the second offset area lies against the first plate and such that the first offset area lies against the second plate
 iv. Inserting as in step iii. any additional pin in the additional matching apertures located in the first and second plates or in any additional first and second plates such that pins are mounted by pairs
 v. Joining the at least one first and second plates together via fastening means which pass through the matching apertures of the at least first and second plates such that first and second plates lie one against the other
 wherein:
  the two pins are aligned according to a direction that is parallel to a longitudinal axis of the second plate
  both pins are sufficiently spaced apart along a direction that is parallel to a longitudinal axis of the second plate, and
  the two pins have opposite orientations one with respect to the other.

This disclosure also explains a method to transmit mechanical energy in a rear underrun protection as per this disclosure, the method comprising receiving a rear underrun shock on the bar, each pin transmitting mechanical energy produced by the shock to the frame through shear force.

The method to transmit mechanical energy in a rear underrun protection may be such that the shear force in each pin is of more than 60 kN at the time of the shock.

The method to transmit mechanical energy in a rear underrun protection may be such that each bolt transmits mechanical energy produced by the shock to the frame through shear force, whereby the shear force in each bolt is of less than the shear force in each pin at the time of the shock.

This disclosure also describes a method to machine a pin according to this disclosure, whereby the pin is machined by milling an integral piece of metal.

DETAILED DESCRIPTION

Some pins may have a shape corresponding to a single cylinder having a circular cross section, such pins being lodged between two mechanical pieces in a cylindrical space, recess, chamber or aperture matching the shape of the pin. While such pins may be effective at contributing to the positioning of the mechanical pieces, or at transmitting forces between the mechanical pieces, it was found that such pins may move or slide away from the cylindrical space in which they are lodged. This may for example be resolved by soldering such pins into place. Such soldering may however be rendered ineffective if for example a significant force is transmitted between the mechanical pieces, whereby such significant force produces breakage of the soldering material, thereby potentially allowing a pin to move out of its position. The present disclosure proposes a pin which may resolve such issues.

This disclosure relates to a pin. In some examples, a pin is a single, integral mechanical piece which has a specific shape. In some examples, a pin is a metal pin. In some examples, a pin is a plastic material or plastic resin pin. The pin according to this disclosure comprises a first cylindrical portion along a pin axis. A cylindrical portion should be understood as a portion which has a shape corresponding to a volume generated by translating a cross section along an axis which is the pin axis. A cross section may for example be a circular, elliptical, oval or polygonal cross section.

The pin according to this disclosure also comprises a second cylindrical portion along the pin axis. The second cylindrical portion has a shape corresponding to a volume generated by translating a cross section along an axis which is the same pin axis as the pin axis generating the first cylindrical portion. A cross section of the second cylindrical portion may for example be a circular, elliptical, oval or polygonal cross section. The cross section of the second cylindrical portion may be the same as or may differ from the cross section of the first cylindrical portion. Using a same cross section for both the first and second cylindrical portions may ease manufacture and permit reversible placement. Using different cross section may permit providing different characteristics for each cylindrical portion, for example to influence the manner in which forces may be transmitted by the pin.

According to this disclosure, the pin according to the present invention comprises two cylindrical portions, the first cylindrical portion axis being offset from the second cylindrical portion axis with the first and the second cylindrical portions sharing a common end plane perpendicular to the pin axis. Such common end plane corresponds to one end of the first cylindrical portion, and to one end of the second cylindrical portion. The first and second cylindrical portions connect at such common end plane perpendicular to the pin axis. The common end plane indeed is defining both a first end cross section at which the first cylindrical portion terminates and a second end cross section at which the second cylindrical portion terminates.

According to this disclosure, the first and second end cross sections partially coincide along a common end cross section area. In other words, the first and second end cross sections do not exactly overlap in the common end plane.

This leads to a pin having a discontinuous structure or shape, which will participate in resolving the issue of a pin sliding out of its lodgment as discussed above.

According to this disclosure, the first end cross section further comprises a first offset area extending away from the second end cross section. The first offset area thereby extends away from the common end cross section area. The first offset area thereby is a flat area in the common end plane. Such first offset area may be leaning against a corresponding surface of a mechanical piece with which the pin may cooperate.

According to this disclosure, the second end cross section further comprises a second offset area extending away from the first end cross section. Similarly to the first offset area, the second offset area thereby extends away from the common end cross section area. The second offset area thereby is a flat area in the common end plane. Such second offset area may be leaning against a corresponding surface of a mechanical piece with which the pin may cooperate. The size and shape of an offset area may be chosen in order to influence the manner with which a pin may cooperate with another mechanical piece against which the offset lies.

While the common end cross section area provides structural integrity to the pin by joining the first and the second cylindrical portions, the first and second offset areas provide mechanical structures which permit locking the pin in place in a mechanical system. Such first and second offset areas also may participate in transferring forces from the pin to one or more mechanical pieces against which either one of or both first of the first and second offset areas may lie.

Figure 1:
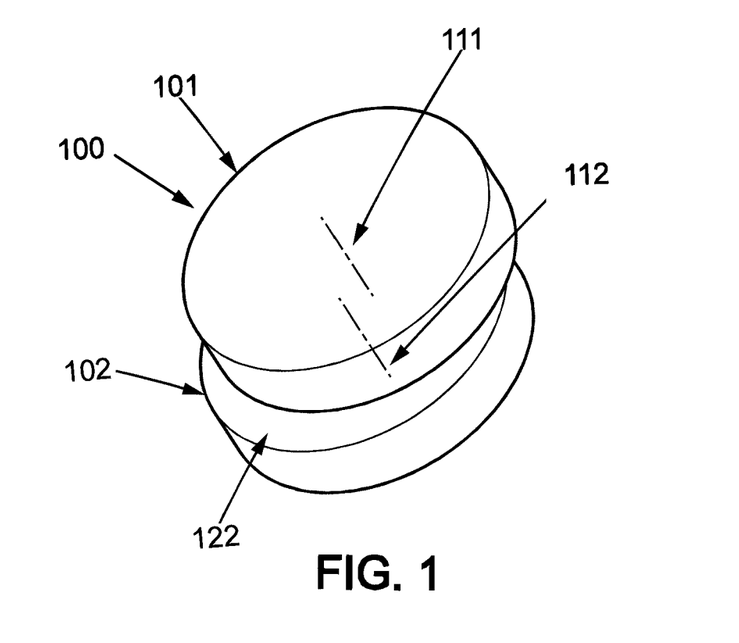
FIG. 1 illustrates an example of a pin according to this disclosure.

FIG. 1 illustrates an example of a pin 100 according to this disclosure. In this example, the pin 100 comprises a first cylindrical portion 101 which has a first circular cross section and a first cylindrical portion axis 111. The pin 100 also comprises a second cylindrical portion 102 which has a second circular cross section and a second cylindrical portion axis 112 which is parallel to first cylindrical portion axis 111 and also to an axis of pin 100. In this FIG. 1 it is clearly shown that axis 112 is being offset from axis 111. This structure leads to creating second offset area 122 as well as a first offset area which is not visible in this figure, both offset areas having a crescent shape resulting from the shape of the respective cross sections which extend away from a common end cross section area. The common end cross section area together with the first offset area corresponds to the cylindrical cross section of the first cylindrical portion. The common end cross section area together with the second offset area corresponds to the cylindrical cross section of the second cylindrical portion.

Figure 2:
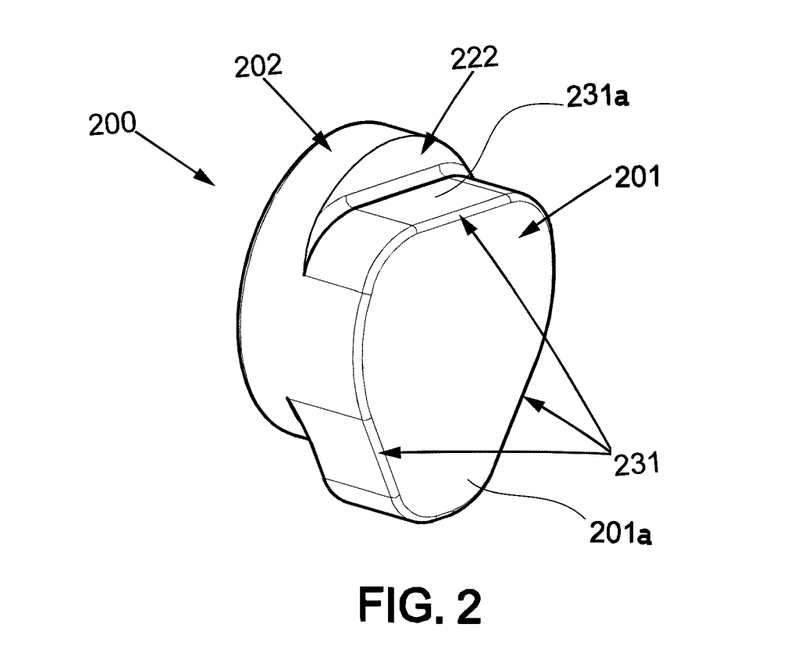
FIG. 2 illustrates another example of a pin according to this disclosure.

FIG. 2 illustrates another example of a pin according to this disclosure. In this example, the pin 200 comprises a second cylindrical portion 202 which has a second circular cross section. The pin 200 also comprises a first cylindrical portion 201 whereby the first cylindrical portion 201 comprises three flat areas 231, the first end cross section comprising three segments corresponding to the three flat area, the three flat area being comprised in planes parallel to the pin axis, each one of the three segments being comprised in a respective edge of an equilateral triangle such that this structure leads to creating second offset area 222 as well as a first offset area which is not visible in this figure where the second offset area 222 is in the opposite direction of the first offset area along the common end plane, with both offset areas having a shape resulting from the respective cylindrical cross section once removing the end common cross section area. If we consider the cylindrical portion 201 having a triangular shape, one flat area 231a is the border of the second offset area 222 and one apex area 201a forms the first offset area which is not visible in this figure.

One should note that while the illustrated offset areas each form a single offset area, each offset area may comprise several disjoined areas, in function of the shape of the cylinder cross sections of the cylindrical portions. One could for example consider flower like or star like cross sections for either one of or both of the first and second cylindrical portions, such that the offset areas would comprise several areas.

The pin illustrated in FIG. 2 comprises 3 flat areas 231 which may for example participate in precisely placing, assembling or orienting the pin or participate in transferring or transmitting a component of a force in a direction perpendicular to each flat area. The pin illustrated in FIG. 2 thereby permits that each one of the three flat areas transmits a component of a force 120 degrees from each other, due to the equilateral triangle shape on which the cylindrical portion 201 is based.

In other examples which are not illustrated, the first cylindrical portion comprises a flat area, the first end cross section comprising a segment corresponding to the flat area, the flat area being comprised in a plane parallel to the pin axis, whereby such flat area may participate in locating such a pin and in transferring or transmitting a component of a force in a direction normal or perpendicular to the flat area. The first cylindrical portion may comprise two or more such flat areas. Two flat areas may face each other along a parallel plane to transmit opposite components of forces.

In some examples, each one of the first and the second offset areas covers a surface of less than 30% of the surface of the common end cross section area. This participates in ensuring that the pin maintains a relatively large common end cross section. If the first offset covers 30% of the surface of the common end cross section area and if the second offset covers 30% of the surface of the common end cross section area, the common end cross section area would indeed represent slightly more than thrice the surface of any one of the first or second offset areas. In some examples, each one of the first and the second offset areas covers a surface of less than 40% of the surface of the common end cross section area. In some examples, each one of the first and the second offset areas covers a surface of less than 20% of the surface of the common end cross section area. In some examples, each one of the first and the second offset areas covers a surface of less than 10% of the surface of the common end cross section area. In some examples, each one of the first and the second offset areas covers a surface of less than 5% of the surface of the common end cross section area.

In some examples, the pin has a height along the pin axis, whereby the height is less than the square root of the common end cross section. In some examples, the height is less than two thirds of the square root of the common end cross section. In some examples, the height is less than a third of the square root of the common end cross section. Limiting the height of the pin compared to the size of the common end cross section may permit gaining space in the height direction while maintaining a function of the pin as a shear pin.

In some examples, a pin according to this disclosure is comprised in a system. Such system comprises a first plate parallel to the common end plane and comprising a first aperture matching the first end cross section, whereby the first cylindrical portion of the pin is inserted in the first aperture, and whereby the second offset area lies against the first plate. The first aperture in the first plate may go through the plate or may be a recess in the plate, whereby the first cylindrical portion of the pin would fit into the recess. The fact that the second offset area lies against the first plate participates in precisely placing the pin, whereby the pin fits into the first aperture until the second offset area abuts flush against the first plate.

An example system further comprises a second plate parallel to the common end plane and comprising a second aperture matching the second end cross section, whereby the second cylindrical portion of the pin is inserted in the second aperture, and whereby the first offset area lies against the second plate, the second plate lying against the first plate. The second aperture in the second plate may go through the second plate or may be a recess in the second plate, whereby the second cylindrical portion of the pin would fit into the recess. The fact that the first offset area lies against the second plate participates in precisely placing the pin, whereby the pin fits into the second aperture until the first offset area abuts flush against the first plate.

In some examples, the apertures match the respective cylindrical portions in order to permit a tight fit. In some examples, the apertures match the respective cylindrical portions in order to permit a soldering to reinforce a junction between a plate and the pin. In some examples, the apertures match the respective cylindrical portions in order to permit a loose fit. The aperture may exactly match or approximately match the shape of a corresponding cylindrical cross section. In an example of an approximate match, an aperture matching the cylindrical portion 201 based on an equilateral triangle may be a circular aperture in which cylindrical portion is tight fitted.

Figure 3A:
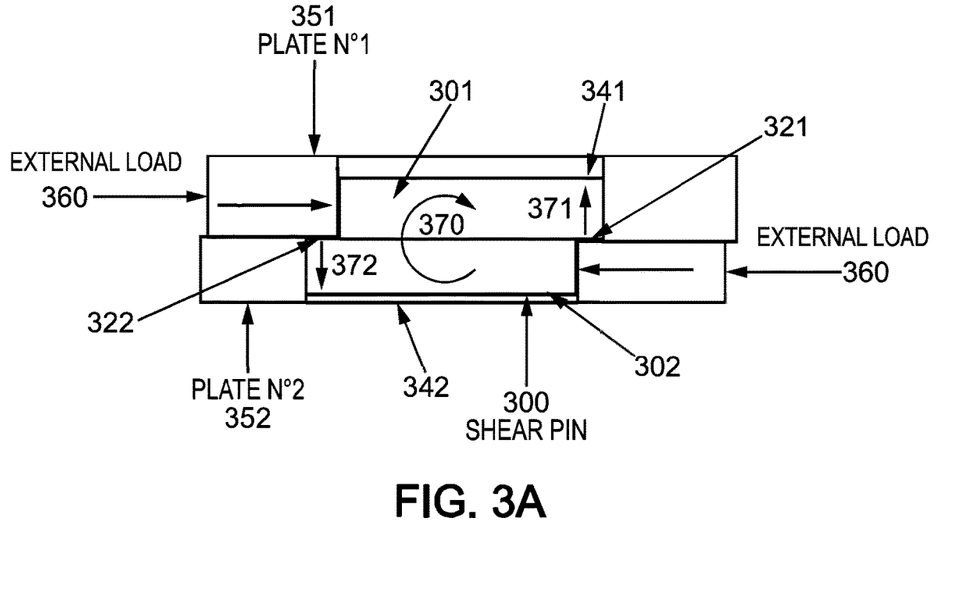
FIG. 3A illustrates an example of a system according to this disclosure.

An example system is represented in FIG. 3A. Pin 300 comprises a first cylindrical portion 301 and a second cylindrical portion 302. First cylindrical portion 301 is located within a first aperture 341 into a first plate 351 or "PLATE No 1". Second cylindrical portion 302 is located within a second aperture 342 into a second plate 352 or "PLATE No 2". FIG. 3A illustrates how the first offset 321 lies against the second plate and the second offset 322 against the first plate. FIG. 3A illustrates how the pin is locked in place between the first and second plates through the disposition of the offset areas against the plates, preventing the pin from sliding out of position, as long as the plates are held against each other. FIG. 3A also illustrates how the pin participates in transmitting mechanical energy. In case of an external load 360 applied in opposite directions on the first and second plates in a direction comprised in the common plane (which is the horizontal plane in the representation of FIG. 3A), the external load will produce a resulting torque 370 on pin 301, such torque producing a shear force, the pin behaving as a shear pin, the pin being submitted to resulting forces 371 and 372, the resulting forces being in a direction perpendicular to the common plane and being applied from the first plate to the second offset area, and from the second plate to the first offset area.

In some examples, the plates are metal plates. In some examples, the plates are elongated along a longitudinal direction parallel to the common plane of the pin. In some examples, the first and second plates are held against each other by fastening elements. In some examples, the plates are elongated along a longitudinal direction parallel to the common plane of the pin and are cylindrical, the cylindrical plates having for example a rectangular cross section along its longitudinal direction. In some examples, the plates have a thickness along the pin axis, whereby the thickness is of less than twice a height of a respective cylindrical portion of the pin along the pin axis. In some examples, the plates have a thickness along the pin axis, whereby the thickness is of less than 1.5 times a height of a respective cylindrical portion of the pin along the pin axis. In some examples, the plates have a thickness along the pin axis, whereby the thickness is of less than 1.2 times a height of a respective cylindrical portion of the pin along the pin axis. Such relationship between the thickness of a plate and the height of a corresponding cylindrical section may permit that a pin may act as a shear pin while limiting the space occupied by the pin.

Figure 3B:
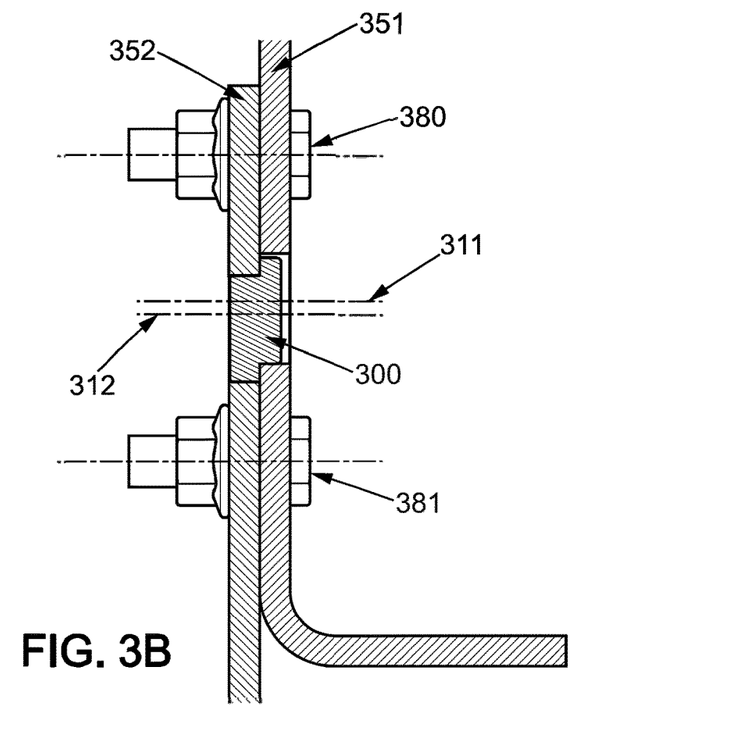
FIG. 3B illustrates an example of another system according to this disclosure.

Another example system is represented in FIG. 3B. The system of FIG. 3B comprises elements such as a pin 300, first plate 351 and second plate 352 similar to the elements of FIG. 3A and represented by the same reference numerals. In this example, 311 is a central axis of the first cylindrical portion, and 312 is a central axis of the second cylindrical portion, the central axis 311 and 312 being parallel to and shifted from each other to produce the offset areas. The system of FIG. 3B further comprises bolts 380 and 381 joining the first 351 and the second 352 plates together, whereby the first and second plates comprise matching through apertures for the bolts (not represented here), the bolts passing through the matching through apertures for the bolts. The matching through apertures for the bolts are matching the bolts, and go through each plate so each bolt may be bolted. It should be noted that in case of submitting the system of FIG. 3B to a shearing action as illustrated in FIG. 3A, the bolts and pin will be submitted to shear forces, the forces applying to the pin relieving the force applied to the bolts. It should be noted that such relief on the force submitted to the bolts may prevent a mechanical rupture of such bolts. It should be noted that the pin structure may be very efficient in that the height of the pin along the pin axis parallel to either one of axis 311 or 312 may be very reduced, in particular compared to the height of bolts 380 and 381 along their bolt axis.

It also should be noted that other possible systems according to this disclosure and comprising such a pin and bolts or other fastening elements or other plate shapes may be considered, including various numbers of pins and fastening elements.

Figure 4:
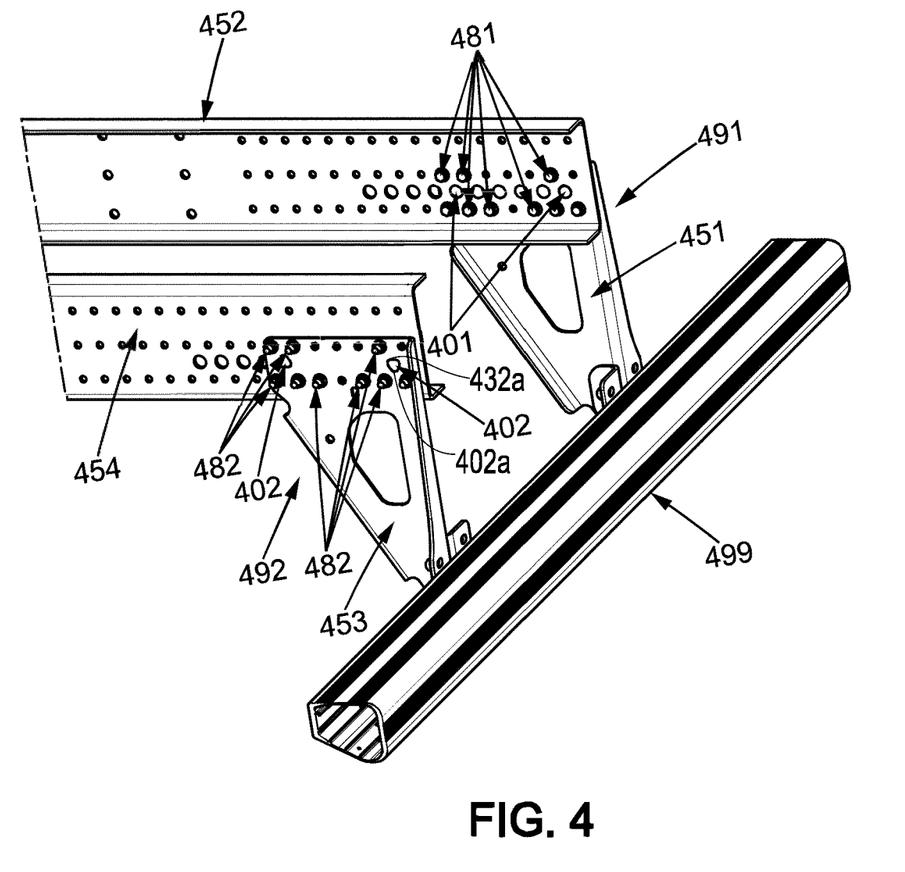
FIG. 4 illustrates an example of a rear underrun protection according to this disclosure.

FIG. 4 illustrates a system 491 according to this disclosure and another system 492 according to this disclosure. System 491 comprises nine bolts 481 and two pins 401 between a first plate 451 and a second plate 452 according to this disclosure. Other system 492 comprises other nine bolts 482 and other two pins 402 between another first plate 453 and another second plate 454 according to this disclosure. Systems 491 thereby comprises an additional pin according to this disclosure, the first plate 451 comprising an additional first aperture matching the first end cross section of the additional pin, whereby the first cylindrical portion of the additional pin is inserted in the additional first aperture, and the second plate 452 comprising an additional second aperture matching the second end cross section of the additional pin, whereby the second cylindrical portion of the additional pin is inserted in the additional second aperture. The other system 492 has the same structure as the system 491 in this example.

The system illustrated in FIG. 4 further comprises a bar 499 to form a rear underrun protection for a truck, the rear underrun protection comprising systems 491 and 492, the rear underrun protection further comprising a frame, the bar being attached to two or more brackets, each bracket comprising a first plate 451 and 453, the frame comprising the second plates 452 and 454. While this specific example of a rear underrun protection comprises 2 brackets and frames, other configurations may be considered.

In the system illustrated in FIG. 4, one or more pins comprise a flat area according to the present disclosure, whereby such one or more pin is inserted so that the flat area is comprised in a plane perpendicular to a longitudinal axis of the truck, the longitudinal axis of the truck being in this example perpendicular to the bar and parallel to the longitudinal axis of second plates or frames 452 and 454. The longitudinal axis of the truck also corresponds to the direction along which the truck is driven.

In the system of FIG. 4, the offset areas of the pins lie against the plates so as to transmit to the plates a shear force originating from a rear underrun shock. The system of FIG. 4 comprises a total of four pins, one pair per frame 454, 452 or one pair per bracket 451, 453, each pin of each pair being mounted in an opposite direction one to the other along a direction perpendicular to the longitudinal direction of the frames 454, 452 behaving in case of shock as illustrated in FIG. 3A. In FIG. 4, it is clearly shown that pins 300 have the shape illustrated in FIG. 2 i.e. with the second cylindrical portion 401 having a circular shape and the first cylindrical portion 402 having a triangular shape. If we consider the first cylindrical portions 402 shown in FIG. 4, one can see that they are mounted in opposite direction: both pins of the pair of pins having the flat part 432a parallel to the longitudinal axis of the frame 454 but each pin having the apex area 402a in an opposite direction along the direction perpendicular to the longitudinal axis of the frame 454.

A rear underrun protection as illustrated in FIG. 4 may be comprised in a truck and be located at the bottom back end of a truck to avoid or limit the possibility that a vehicle slide under the truck in case of a rear collision. In such a case, a collision would apply a force onto the bar 499, the force being transmitted to the brackets 451 and 453 corresponding to the first plates 451 and 453, the force being in turn transmitted to the frame or second plates 452 and 454 through the bolts and pins, the pins acting as shear pins and reducing a risk or rupture of the bolts, thereby participating in maintaining the integrity of the rear underrun protection.

In the preferred embodiment as shown in FIG. 4, the assembly includes two pins 300 mounted on each frame 452, 454 in opposite direction perpendicularly to the direction of the longitudinal axis. Both pins being aligned on the frame 452, 454 along the longitudinal axis and sufficiently spaced one from the other (e.g. at least 5 cm). The distance between two pins of a pair of pins depends on the size of the pins themselves. With pins of a size of approximately 12 mm in thickness and the cylindrical part being 24 mm in diameter, those should be spaced apart of at least 10 cm and more preferably between 18 cm and 23 cm. Without load on the device, there is no contact between the pin 300 and the frame 452, 454 (there is a little gap). Therefore, in order to ease the installation and prevent the pins 300 from falling, each pin 300 is maintained in place (e.g welded, glued . . . ) on the bracket 451, 453. During the application of force, the bracket 451, 453 and the frame 452, 454 slide relative to each other as there is no contact between the pin and frame without load. At this moment with the force applied, there is a contact between pins, bracket, and frame.

The special shape of pins 300 as described above, especially in FIGS. 1 and 2, prevent the pins 300 from being ejected. The shear force between the bracket 451, 453 and the frame 452, 454 tend to rotate the pin 300, but the particular shape of the pins 300 inserted in the assembly, as shown in FIGS. 3A and 3B, enable locking the rotation of the pin 300 and the pin gets self-stuck (even if pins are made with thin sheets, example: 5 mm thickness).

Other embodiments may also be considered where for example each pin would be maintained in place on the frame 452, 454 or where there would be more than one pair of pins with each pair being aligned on the frame 452, 454 along a direction that is parallel to a longitudinal axis of the frame 452, 454 and sufficiently spaced apart (at least 5 cm) along this same axis and each pair of pins having the two pins mounted in opposite orientations one with respect to the other.

In some examples, including the example illustrated in FIG. 4, the common end cross section area of the pin is of more than 200 mm$^2$ and of less than 1500 mm$^2$. In some examples, the common end cross section area of the pin is of more than 400 mm$^2$ and of less than 1200 mm$^2$. In some examples, the common end cross section area of the pin is of more than 600 mm$^2$ and of less than 1000 mm$^2$.

Figure 5:
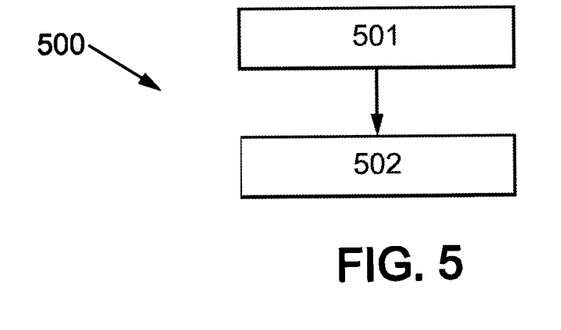
FIG. 5 illustrates an example of a method to transmit mechanical energy in a rear underrun protection as per this disclosure.

FIG. 5 illustrates an example method 500 to transmit mechanical energy in a rear underrun protection such as, for example, rear underrun protection illustrated in FIG. 4, the method comprising receiving 501 a rear underrun shock on the bar 499, each pin 401, 402 transmitting 502 mechanical energy produced by the shock to the frame 452, 454 through shear force. Note that such method may apply to underrun protections comprising a shear pin according to this disclosure and different from the specific underrun protection illustrated in FIG. 4.

In some examples of method to transmit mechanical energy in a rear underrun protection as per this disclosure, whereby the shear force in each pin is of more than 60 kN at the time of the shock. In some examples, the shear force in each pin is of more than 90 kN at the time of the shock. In some examples, the shear force in each pin is of more than 100 kN at the time of the shock.

In some examples of method to transmit mechanical energy in a rear underrun protection as per this disclosure whereby the rear underrun protection comprises two or more systems that are according to this disclosure and comprising bolts as per FIG. 3B or FIG. 4, whereby each bolt transmits mechanical energy produced by the shock to the frame through shear force, the shear force in each bolt is of less than the shear force in each pin at the time of the shock, such that the pin reduces the risk that the bolts break. In some examples, a force applied to the bar at the moment of a shock is of less than 180 kN. In some examples, a force applied to the bar at the moment of a shock is of less than 150 kN. In some examples, a force applied to the bar at the moment of a shock is of less than 100 kN. In some examples, a force applied to the bar at the moment of a shock is of more than 80 kN. In some examples, a force applied to the bar at the moment of a shock is of more than 25 kN. In some examples, a force applied to the bar at the moment of a shock is of more than 40 kN. In some examples, a force applied to the bar at the moment of a shock is of more than 50 kN. In some examples, a shear force applied to a bolt at the moment of a shock is of more than 10 kN. In some examples, a shear force applied to a bolt at the moment of a shock is of more than 20 kN. In some examples, a shear force applied to a bolt at the moment of a shock is of more than 30 kN. In some examples, a shear force applied to a bolt at the moment of a shock is of less than 50 kN. In some examples, a shear force applied to a bolt at the moment of a shock is of less than 45 kN. In some examples, a shear force applied to a pin at the moment of a shock is of more than 50 kN. In some examples, a shear force applied to a pin at the moment of a shock is of more than 80 kN. In some examples, a shear force applied to a pin at the moment of a shock is of more than 120 kN. In some examples, a shear force applied to a pin at the moment of a shock is of more than 130 kN. In some examples, a shear force applied to a pin at the moment of a shock is of less than 160 kN. In some examples, a shear force applied to a pin at the moment of a shock is of less than 150 kN. Such numerical thresholds may be combined in function of specific design specifications, including various dimensions, number of pins, bolts or brackets or materials used for a specific rear underrun protection, in order to reduce the risk of mechanical rupture of any of such elements.

In some examples of a method to machine a pin according to this disclosure, the pin is machined by milling an integral piece of metal. Such a method permits maintaining structural integrity while obtaining the offsets. In particular, such a method ensures structural integrity in the area of the common end plane which may be submitted to shear. Such a method may permit a manufacturing precision of the order of a tenth of a millimeter. Such a method may permit a manufacturing precision of the order of a hundredth of a millimeter.

The invention claimed is:

1. A rear underrun protection for a truck, comprising:
   a bar and a frame, the bar being attached to two or more brackets, each bracket comprising a first plate, the frame comprising at least two second plates; and
   two or more systems, each system comprising:
   at least one pin having a first cylindrical portion defining a first central axis and a second cylindrical portion defining a second central axis that is parallel to and offset from the first central axis;
   the first plate comprising a first aperture matching with the cross section of the first cylinder portion;
   each second plate comprising a second aperture matching with the cross section of the second cylinder portion, the second plate lying against an associated first plate;
   wherein the first cylindrical portion of the pin is inserted in the first aperture and comprises a first surface that axially abuts against the second plate and wherein the second cylindrical portion of the pin is inserted in the second aperture and comprises a second surface that axially abuts against the first plate.

2. The rear underrun protection for a truck according to claim 1 further comprising bolts joining the first and the second plates together, wherein the first and second plates comprise matching through apertures, the bolts passing through the matching apertures.

3. The rear underrun protection for a truck according to claim 1, wherein each of the two or more systems comprises:
   at least one additional pin,
   the first plate comprising at least one additional aperture matching the first end cross section of the at least one additional pin,
   the second plate comprising at least one additional aperture matching the second end cross section of the at least one additional pin,
   whereby the first cylindrical portion of the at least one additional pin is inserted in the at least one additional aperture of the first plate and comprises a first surface that axially abuts against the second plate and whereby the second cylindrical portion of the at least one additional pin is inserted in the at least one additional aperture of the second plate and comprises a second surface that axially abuts against the first plate.

4. The rear underrun protection for a truck according to claim 3, wherein:
   the at least one pin and the at least one additional pin of each of the two or more systems are aligned according to a direction that is parallel to a longitudinal axis of the second plate
   both the at least one pin and the at least one additional pin are spaced apart along a direction that is parallel to a longitudinal axis of the second plate, and
   the at least one pin and the at least one additional pin have opposite orientations one with respect to the other.

5. The rear underrun protection according to claim 1, wherein at least the first or second offset area of each pin is a flat area in the common end plane, wherein the pin is inserted so that the flat area is comprised in a plane perpendicular to a longitudinal axis of the truck.

6. The rear underrun protection according to claim 1, wherein the offset areas of each pin lie against the plates so as to transmit to the plates a shear force originating from a rear underrun shock.

7. An assembly method of a rear underrun protection for a truck according to claim 1, the method comprising:
   attaching the two or more brackets to the bar;
   attaching the frame to the two or more brackets;
   inserting the first cylindrical portion of the at least one pin in the first matching aperture of the first plate of each bracket and inserting the second cylindrical portion of the at least one pin in the second matching aperture of an associated second plate of the frame such that the second offset area lies against the first plate and such that the first offset area lies against the second plate;
   inserting the first cylindrical portion of at least one additional pin in at least one additional aperture of the first plate of each bracket and inserting the second cylindrical portion of the at least one additional pin in at least one additional aperture of the associated second plate of the frame such that the second offset area lies against the first plate and the first offset area lies against the second plate and the least one pin and the least one additional pin are mounted by pairs; and
   joining together each first plate with the associated second plate via fastening means which pass through the matching at least one additional aperture of the first plate and at least one additional aperture of the associated second plates such that first and second plates lie one against the other,
   whereby:
   the at least one pin and at least one additional pin are aligned according to a direction that is parallel to a longitudinal axis of the second plate,
   both the at least one pin and at least one additional pin are spaced apart along a direction that is parallel to a longitudinal axis of the second plate, and
   the at least one pin and at least one additional pin have opposite orientations one with respect to the other.

* * * * *